United States Patent
Jeong et al.

(10) Patent No.: US 6,760,567 B1
(45) Date of Patent: Jul. 6, 2004

(54) APPARATUS AND METHOD FOR MEASURING QUALITY OF A REVERSE LINK IN A CDMA SYSTEM

(75) Inventors: Kyung Soo Jeong, Kyunggi-do (KR); Jong Min Cheong, Kyunggi-do (KR); Taehoon Park, Kyunggi-do (KR); Sang Hoon Seo, Kyunggi-do (KR); Sun Park, Kyunggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 602 days.

(21) Appl. No.: 09/582,199

(22) Filed: Jun. 29, 2000

(30) Foreign Application Priority Data

Jul. 12, 1999 (KR) .............................. 99-28070

(51) Int. Cl.$^7$ .............................................. H04B 17/00
(52) U.S. Cl. ..................... 455/67.1; 455/67.1; 455/69; 455/70; 455/522; 455/423; 370/252; 370/335
(58) Field of Search ............................. 455/69, 70, 522, 455/67.1, 67.3, 296, 298, 127, 423; 370/252, 335

(56) References Cited

U.S. PATENT DOCUMENTS

| | | | | | |
|---|---|---|---|---|---|
| 5,623,484 | A | * | 4/1997 | Muszynski | 370/335 |
| 5,701,294 | A | * | 12/1997 | Ward et al. | 370/252 |
| 5,737,359 | A | * | 4/1998 | Koivu | 375/202 |
| 6,167,259 | A | * | 12/2000 | Shah | 455/424 |
| 6,330,429 | B1 | * | 12/2001 | He | 455/67.1 |
| 6,411,799 | B1 | * | 6/2002 | Padovani | 455/69 |
| 6,501,958 | B1 | * | 12/2002 | Hwang et al. | 455/522 |

FOREIGN PATENT DOCUMENTS

JP       96 65229    3/1996

OTHER PUBLICATIONS

Dieter Emmer et al., Measurements of Base Station Two-Branch Space and Polarization Diversity Reception and a Comparison of the Diversity Based on the CDF of Signal Level and Simulations of BER in a GSM System, IEEE, vol.: 1, May 18–21, 1998, pp. 5–10.*
Osama Ata et al., Effect of Power Change from Interferer Sources on the CDF Probability in a Mobile Radio Cellular System, IEEE, Mar. 19–21, 1996, pp. 217–221.*
Ahmed et al., Multipath Measurements Over Obstructed Radio Transmission Paths, IEEE, vol.: 1, Sep. 14–17, 1993, pp. 504–509.*

* cited by examiner

Primary Examiner—Lee Nguyen
Assistant Examiner—Earl J Moorman, III
(74) Attorney, Agent, or Firm—Rothwell, Figg, Ernst & Manbeck

(57) ABSTRACT

An apparatus and method for measuring the quality of a reverse link and the load of a base station (BTS) in a CDMA mobile telecommunication system. The apparatus and method periodically detect the power of a receiving signal from a mobile station to a BTS, constructs a practical statistical distribution curve for a power ratio of signal to interference, compares the practical distribution curve with the theoretical distribution curve pre-constructed based upon the parameter condition of a BTS, and determines the quality of a reverse link based upon the difference between the distribution curves. The link-quality measuring device has a power detecting unit for detecting the power of signals received by a BTS; a converter for digitizing the detected power; a controlling unit constructing a PDF (Probability Density Function) and/or a CDF (Cumulative Distribution Function) for a ratio of a received power to a background noise power using the digitized data, comparing the constructed function with the theoretical PDF and/or CDF for the ratio which is pre-calculated based upon various values of input parameters, and acquiring the traffic load according to the compared result; and data entering unit for receiving the values for the input parameters provided from an operator or an external device.

15 Claims, 4 Drawing Sheets

APPARATUS AND METHOD FOR MEASURING QUALITY OF A REVERSE LINK IN A CDMA SYSTEM

BACKGROUND OF THE INVENTION

1. Field of the Invention

The present invention relates to a method and an apparatus for measuring a quality of a reverse link and the traffic load applying to a base station (BTS) in a CDMA mobile telecommunication system.

2. Description of the Related Art

In a CDMA mobile telecommunication system, a lot of mobile stations (MSs) communicate with each other via a single frequency allocation (FA). For this reason, the interference from other users has an effect on the quality of communication and the capacity of a system. While the interference of other users does not matter in a forward link since forward signals of all users are synchronous with orthogonal Walsh codes allocated respectively, the interference added to a reverse link has a great effect on the practical performance and capacity of a reverse link since each signal is asynchronous and used codes are not orthogonal each other.

The quality and the performance of a reverse link is highly dependent on the situation of a BTS, the environmental factors for MSs such as the number and moving velocity of a connected MS, moving status, and the quantity of packets being sent, the precision of power control, and the characteristics of air channels providing the signal paths between MSs and a BTS.

To measure the quality of a reverse link, a conventional method would include the step of measuring the quality of a forward link. This is accomplished by using a RSSI (Received Signal Strength Indicator) or Ec/Io (Pilot Power/Total received power), which is measured in a MS, a transmitting power (TX power) of a MS, or a transmission adjusting value of a MS to analyze the quality of a reverse link indirectly.

To measure the quality of a reverse link directly, a voice quality measuring device, for example CECAMS is used.

However, there is no way to measure the service quality such as call drop and bad access since the direct-measuring method can tell only the voice quality. This method can measure the quality of a reverse link of specific time and area when and where the measuring device is installed. These measurements must be made frequently because buildings surrounding a BTS change the wave propagation conditions. However, it is very difficult and uneconomic to examine the thousands of BTS environments by the direct-measuring device at any time. Moreover, the interference from the surrounding cells and the other users, which has a great effect on a reverse link, is not considered in the conventional method.

For this reason, there is an increasing need to measure the quality of a reverse link not temporarily but permanently without involving an operator in measuring the link quality.

To satisfy the need that the link quality between a MSs and a BTS should be automatically measured, the inventions of U.S. Pat. No. 5,623,484, U.S. Pat. No. 5,737,359, and Published Japan Application No. 96-65229 are presented.

However, these methods measure the quality of a reverse link by estimating the traffic based upon the instantaneous power level of the received signals from MSs. Therefore, one of the drawbacks is that the estimated traffic varies in accordance with the power level of received signals.

In practical mobile telecommunication systems, since numerous environmental factors change the power of received signals, and the estimated traffic, which was obtained from the proposed method, varies in a moment, the estimated traffic can not tell the practical traffic of a concerned BTS.

SUMMARY OF THE INVENTION

It is a primary object of the present invention to provide a method and an apparatus that can measure an accurate traffic load and a reverse-link quality of a mobile telecommunication system by statistically calculating the quality of a reverse link and the traffic load of a concerned BTS.

The method and apparatus for measuring the quality of a reverse link according to the present invention which will detect the received power of a BTS, convert the detected power into digital signal by sampling, calculate a ratio of the received power to the background noise power, construct the probability density function (PDF) and/or the cumulative distribution function (CDF) for the calculated ratio values, compare the constructed function with a chosen PDF and/or CDF of a theoretical ratio of a received power to a background noise power which is pre-calculated depending upon specified parameters, and determine the traffic load and the link quality based upon the comparison results.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, preferred embodiments thereof will now be described with reference to the accompanying drawings.

Figure 1:
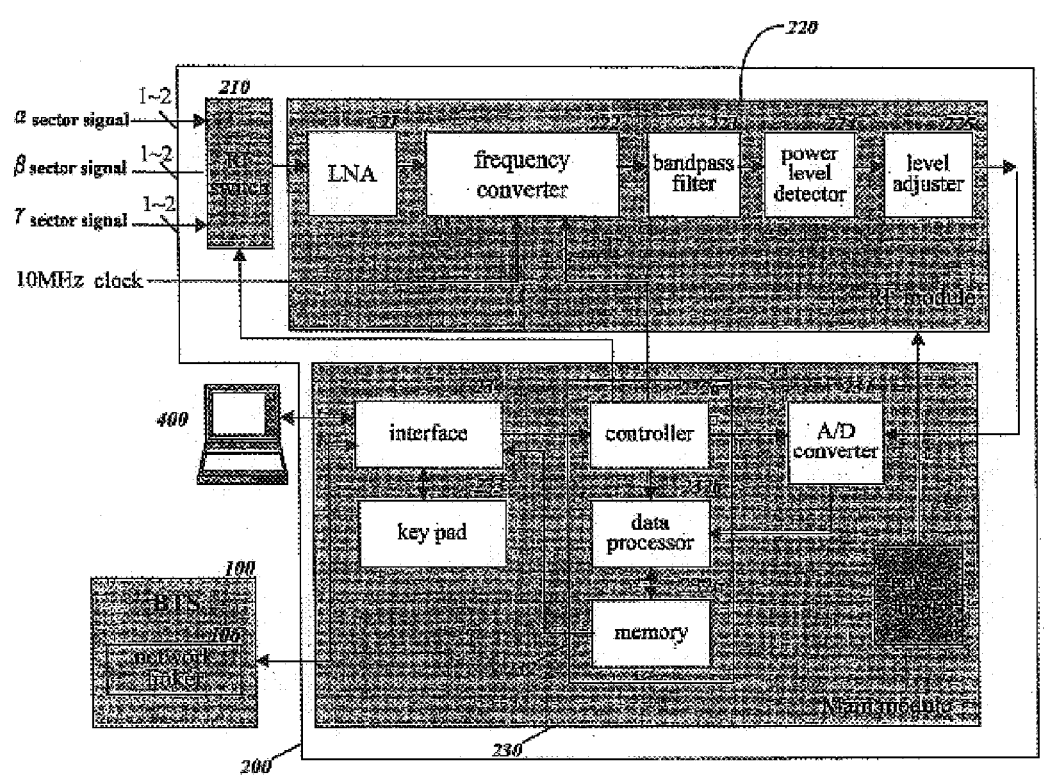
FIG. 1 shows a block diagram of an apparatus for measuring the quality of a reverse link in a CDMA system according to the present invention.

FIG. 1 depicts a block diagram of an example of an apparatus measuring the quality of a reverse link. It comprises an RF switch 210 selecting the input route of the multiple reverse signals which are high-frequency signals received in a BTS from MSs located in an α sector, β sector, and γ sector; a power measuring unit 220 measuring the power of the signal from the RF switch 210; and a main unit 230 calculating the traffic load and the quality of a reverse link, and supervising the overall measuring operation.

The power measuring unit 220 consists of a low-noise amplifier 221 amplifying an input signal from the RF switch 210 with low noise; a frequency converter 222 converting the amplified signal to a intermediate frequency signal corresponding to a concerned FA; a bandpass filter 223 band-passing the converted intermediate frequency signal; a power level detector 224 converting the power level of the band-passed signals to a voltage signal; and the level adjuster 225 adapting the level of the converted voltage signal to the allowable input range of a next device.

The main unit 230 comprises of a key pad 233 for entering parameters used for calculating a PDF/CDF theoretically; a interface 234 for sending/receiving data with a network linker 100 in a BTS and an external device 400 such as a computer; an A/D converter 231 sampling the voltage signal from the level adjuster 225 into digital data; and a controlling unit 232 calculating a ratio Z of a received power to a background noise power based upon the power data obtained from the A/D converter 231, constructing a PDF and/or CDF for the ratio Z, compares the constructed PDF and/or CDF curve with a theoretically calculated PDF and/or CDF for the ratio Z, and determining the traffic load and the reverse-link quality based upon the curve comparison result or a result of comparing an average traffic load provided in real time with a traffic load obtained from the curve comparison.

The controlling unit 232 comprises of a controller 232a controlling the output selection of the RF switch 210 and the signal mixing and synthesis of the frequency converter 221; a data processor 232b executing the aforementioned calculation using the digital data transferred from the A/D converter 231 for constructing a PDF and/or CDF, the curve comparison and determination of traffic load and link quality; and a memory 232 storing intermediate and final data processed by the data processor 232b.

In FIG. 1, two amplifiers with an operating range of above 40 dB may be inserted in the front and behind of the bandpass filter 223 to adjust the received power to the operating range of the power detector 224 in which the sensitivity and linearity is guaranteed. The bandpass filter 223 may be made up of a ceramic filter with good edge characteristics or a SAW (Surface Acoustic Wave) filter, and its bandwidth is 1.23 MHz for a low bandwidth system (Interim Standard-95) or 4 MHz (or 10 MHz) for a wide bandwidth system (CDMA2000 or Wideband-CDMA).

The RF switch 210 can be eliminated by installing multiple power measuring units for each sector signal.

Figure 2:
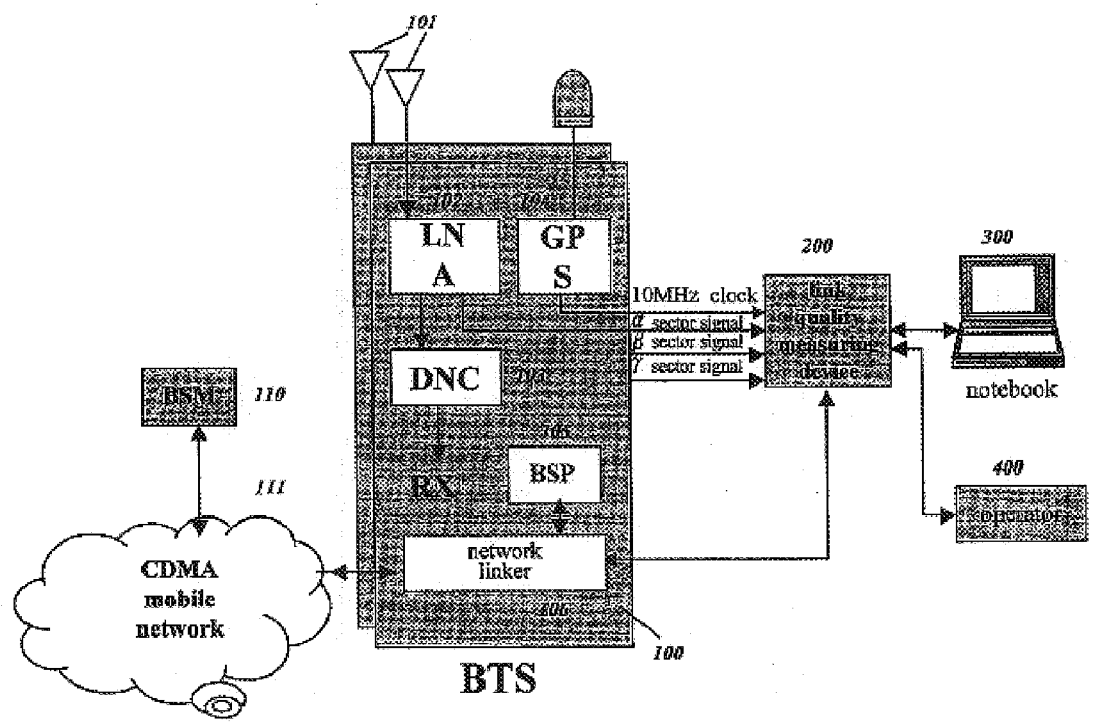
FIG. 2 shows an overall system equipping with the apparatus of FIG. 1.

FIG. 2 depicts an overall system equipped with an apparatus that measures the quality of a reverse link according to the present invention.

Wireless RF signals received through an antenna 101 of a BTS 100 are demodulated after being passed through the low-noise amplifier (LNA) 102 and a down converter (DNC) 103 with an automatic gain control function. The LNA 102 has an internal −3 dB power distributor whose two output terminals are connected to the DNC 103 and a test terminal respectively. The test terminal is used for measuring the quality of a reverse link, so that it is connected to a link-quality measuring device 200. The high-quality 10 MHz reference clock which is generated in a GPS module 104 installed in the BTS 100 is also applied to the link-quality measuring device 200. The 10 MHz reference clock is used for the frequency conversion of the measuring device 200. A local oscillator may be installed in the measuring device 200 to generate 10 MHz clock instead of using the reference clock provided from the GPS module 104. The measuring device 200 receives the low noise amplified signal from the LNA 102, detects the power intensity, converts the detected power to a digital signal, analyzes the converted digital signal according to an algorithm proposed in this invention, and stores the analyzed results.

To measure the quality of a reverse link, the measuring device 200 can use a signal at any point as an input if the point can transfer the power of an RF or IF reverse signal in linear. That is, the signal being inputted to the DNC 103 with an AGC function can be used for measuring the reverse-link quality.

The measuring device 200 can be controlled on-site or remotely. A base-station management (BSM) 110 can control the measuring device 200 through a CDMA mobile telecommunication network 111 and a network linker 106. For example a node distributor for inter-processor communication in the BTS processes the data from the measuring device 200, and delivers the processed data to a local operator 400. The measuring device 200 can communicate with an external computer 300 through the interface 234 so that the computer 300 connected through the interface 234 can control the measuring device 200 and download necessary data to the device 200. Also, the measuring device 200 can be controlled by appropriate commands entered through the key-pad 233 attached to the device itself.

The link-quality measuring operation of the measuring device 200 embodying the present invention is described below in detail.

Figure 3:
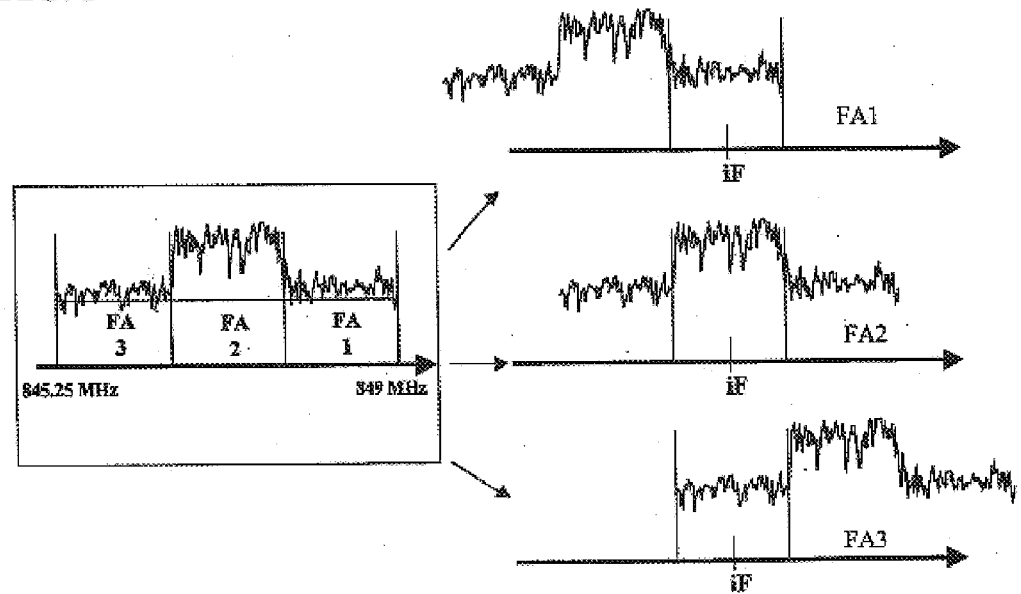
FIG. 3 shows the pictorial explanation for the operation of the frequency converter in FIG. 2.

The RF signals of the α sector, β sector, and γ sector received through the antenna 101 installed in the BTS 100 are transmitted to the link-quality measuring device 200 after being amplified by the LNA 102. The RF signals are sequentially selected by the RF switch 210 according to a selecting signal from the controller 232a. One of the RF signals selected by the RF switch 210 is transferred to the frequency converter 222 after being amplified again by the LNA 221. The frequency converter 222 down-converts the RF signal to an intermediate frequency (IF) signal by mixing a synthesizing signal whose frequency has been set to '(the center frequency of a corresponding FA)(the IF)' by the controller 232a. As depicted in FIG. 3, the frequency converter 222 selects one-band for the FA1, FA2, or FA3 among these 3 FA bands (FA1+FA2+FA3) whose frequency band is 845.25~849 MHz, and converts the RF signal of the selected band to an IF signal assigned to the selected FA. The 10 MHz reference clock from the GPS module 104 installed in the BTS 100 is used as a base clock for the frequency conversion of the frequency converter 222. In the event that the 10 MHz reference signal is unavailable, a local oscillator can provide the base clock. The IF signal from the frequency converter 222 is filtered by the bandpass filter 223 to attenuate signals out of the corresponding IF band, then is transmitted to the power detector 224 which is a logarithmic amplifier. The power detector 224 converts the power of the IF signal to a voltage signal, whose level is adjusted to the input range 0~10[V] of the A/D converter 231 by the level adjuster 225. The A/D converter 231 should have a good enough resolution to cover the input range of 0~10[V]. It is therefore preferable to use an A/D converting chip whose bit length is more than 10 bits. The A/D converter 231 samples the voltage signal from the power detector 224 at a sampling rate preset by the controller 232a, converts the sampled values to digital data and sends them to the data processor 232b sequentially. Such power detecting operation is performed for a time window given by the controller 232a or an external command.

Figure 4:
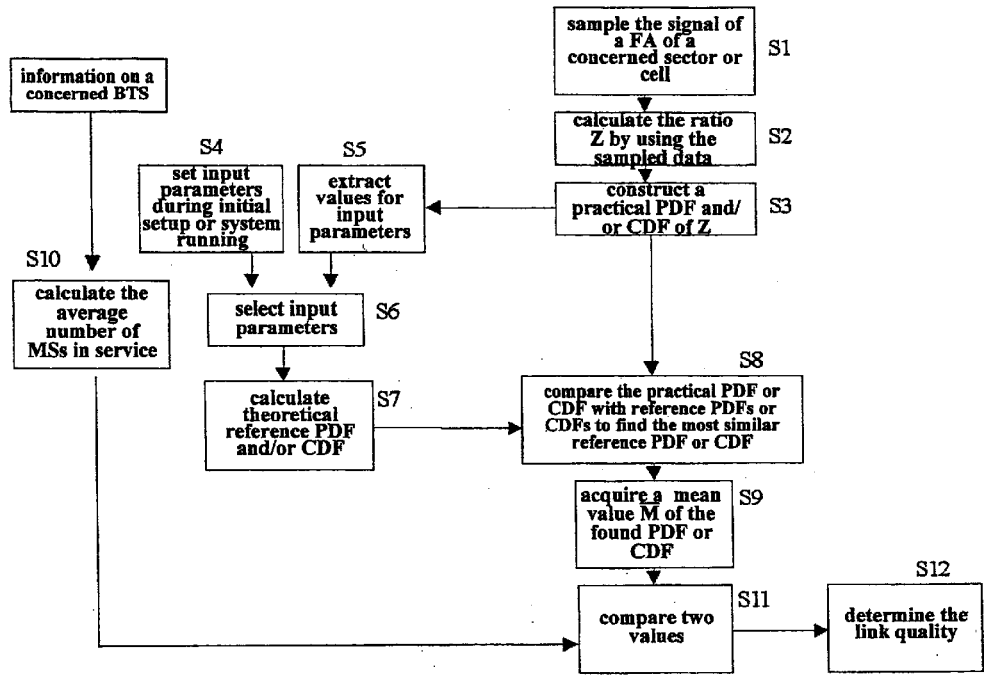
FIG. 4 shows a flowchart of a method for measuring the quality of a reverse link in a CDMA system according to the present invention.
Figure 5:
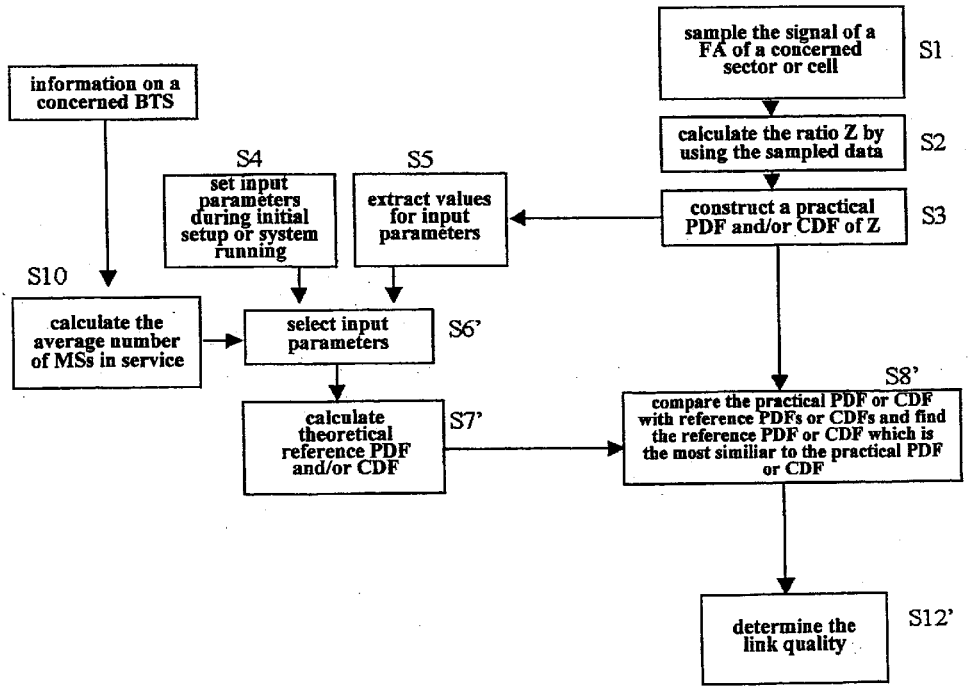
FIG. 5 shows a flowchart of another method for measuring the quality of a reverse link in a CDMA system according to the present invention.

The data processor 232b analyzes the sampled data obtained from the A/D converter 231 in accordance with the algorithm depicted in FIG. 4. or FIG. 5, and then displays an acquired traffic load and link quality on a monitor and also saves them in memory 232c. The sampled data that is to be used in analyzing are also stored in the memory 232c. Those data stored in the memory 232c can be uploaded to the external computer 400 through the interface 234, and can be displayed in raw. Since the controller 232a has an internal timer, it is possible to specify a desirable time window and interval when the data is stored in the memory 232c. The storing parameters such as the period and the number of iterations which should be set to store are automatically entered by an operator through the key-pad 233.

FIG. 4 depicts the flowchart for a method of measuring the quality of a reverse link in a mobile telecommunication system according to the present invention. The algorithm of the flowchart is executed in the data processor 232b of the main unit 230 shown in FIG. 1.

The data processor 232b receives the sampled data from the A/D converter 231 (S1), translates the sampled data to corresponding values of the receiving power and calculates the ratio Z of a received power to a background noise power (S2), and constructs a probability density function (PDF) and/or a cumulative distribution function (CDF) for the ratio Z (S3) after repeating the steps S1 and S2 for a given time window.

Meanwhile, the function parameters are given by an operator through the key-pad 233 and/or a remote computer 400 at start up or during operation (S4). Some parameters are derived and learned from characteristics of the practical PDF and/or CDF curve constructed in the step S3 (S5). Then, it is determined which parameters are used to calculate theoretical PDFs and/or CDFs (S6). The parameters derived from the practical curve is used to replace some parameters given at step S4 or never used according to the determination of the step S6.

The data processor 232b calculates the theoretical PDF and/or CDF curves based upon those selected parameters (S7), compares the practical curve, which is derived in step S3, with the theoretical curves which are calculated in step S7, analyzes the compared results (S8), and determines the practical traffic load $\overline{M}$ for each antenna or each FA (S9). After receiving the call information from the BTS 100, the data processor 232b calculates the average number $\overline{M}$ avg of connected MSs using the call information, compares the calculated $\overline{M}$ avg with the practical $\overline{M}$ acquired in the step S9 (S13), and then judges the quality of a reverse link (S12).

Figure 6:
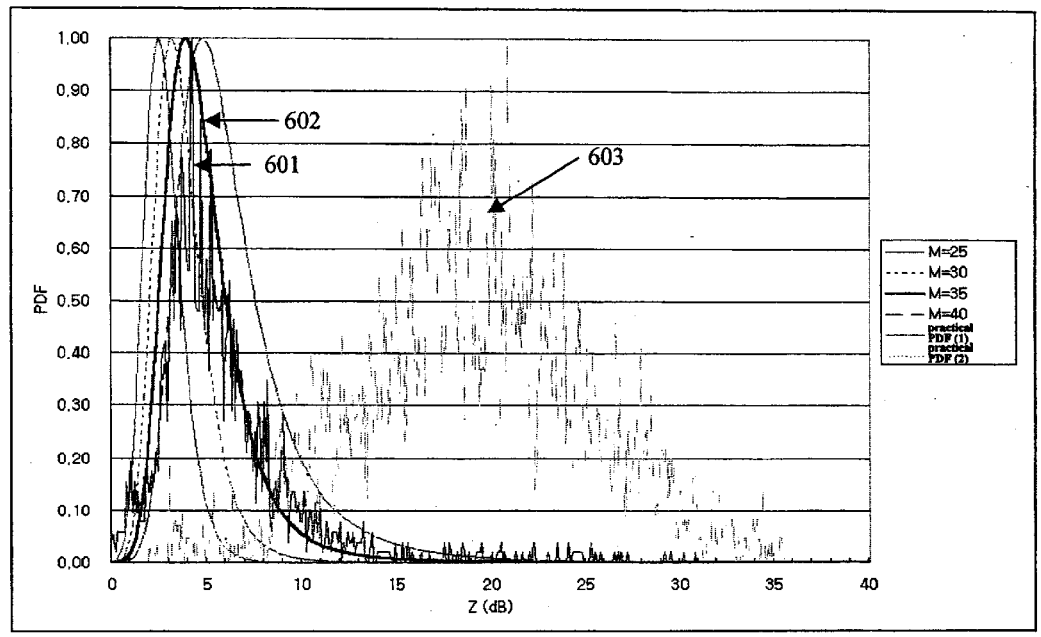
FIG. 6 shows the pictorial comparison between theoretically-constructed PDF curves with a practically-obtained PDF curve obtained from measuring and sampling.

FIG. 6 illustrates example curves that are material to the traffic load acquisition of the step S9 and the comparison of the step S1. If the practical PDF curve derived in the step S3 is 601, the 602 curve is the most similar to the curve 601 in shape among the theoretically-calculated PDF curves. Therefore the current traffic load $\overline{M}$ is estimated to 35 as noted in FIG. 6. Thus, if the difference between the acquired $\overline{M}$ and the average call number $\overline{M}$ avg acquired from the call information provided by the BTS 100 is greater than 10, the quality of a reverse link should be concluded to be bad.

The theoretical PDF and CDF for the ratio Z of a received power to a background noise power is as follows.

$$PDF: p_z(z) = \frac{1}{\sqrt{2\pi Var(x)}} e^{-\frac{[1-e^{-\beta z}-E(x)]^2}{2Var(x)}} \beta e^{-\beta z},$$

$$CDF: P_z(z) = \frac{1}{\sqrt{2\pi}} \int_{-\infty}^{\frac{1-e^{-\beta z}-E(x)}{\sqrt{Var(x)}}} e^{-y^2/2} dy,$$

where, $\beta = \frac{\ln 10}{10}$, $E[X] = \frac{R}{W} \cdot \overline{M} \cdot \overline{v} \cdot e^{\beta\varepsilon + (\beta\sigma)^2/2} \cdot (1+F)$, $Var(X) = \left(\frac{R}{W}\right)^2 \cdot \overline{M} \cdot e^{2\beta\varepsilon + (\beta\sigma)^2} \left[\overline{v^2} \cdot e^{(\beta\sigma)^2} - \overline{v}^2\right] \cdot (1+F)$, R is data transfer speed (for example, 9600 bps), W is bandwidth (for example, 1.23 MHz for IS-95), $\overline{M}$ is average traffic number, $\overline{v}$ is average of a voice activity factor (usually 0.4), $\overline{v^2}$ is average of the square of a voice activity factor, $\varepsilon$ is average of the logarithmic ratio of bit energy to interference for a single MS, $\sigma$ is standard deviation of the logarithmic ratio of bit energy to interference for a single MS, and F is a ratio of the interference power generated from a self cell to that from the adjacent cells.

The characteristics of the PDF and CDF curves for the ratio Z of an input signal power to a background noise power change according to the values of the parameters selected in the step S6. However, since the values of parameters except $\overline{M}$ are obtained in advance from the practical measurement in a system and then set, the theoretical statistical characteristics are affected by the parameter $\overline{M}$ only. As explained above, the values of the input parameters except $\overline{M}$, is preset by an operator during the initial setup or system running, and the values of some parameters may be determined through examining the characteristics of the practical PDF and CDF for the ratio Z and training. For example, since there exists background noise with no traffic at dawn, if a received power is detected at dawn, a parameter of absolute background noise power can be determined as the measured power.

Therefore, after obtaining each PDF and CDF curve in the step S7 according to each value of $\overline{M}$ with other parameters fixed, it is possible to acquire (S9) the practical value of $\overline{M}$ corresponding to one of the obtained PDF and/or CDF curves which is the most similar to the practical PDF and/or CDF curve derived from the measured Z through the comparison (S8) between the practical curve and the obtained reference curves. When finding the reference curve that is most similar to the derived practical curve, two methods may be preferably used. One is to find a theoretical PDF or CDF curve which has MMSE (Minimum mean square error) compared with the practical curve acquired from the measured data for Z, and the other is to find the curve that has the least errors in a predetermined curve section (for example, 50%-ile, median, peak, width from 10%-ile to 90%-ile, etc.).

In addition to the above methods, various curve-fitting methods can be used.

In the above equations, if the parameter F is set to 0, the value determined in the step S9 means the traffic load incoming to a BTS which is the sum of the number of MSs which are in service in the self cell and the number of MSs simulated for the interference from the adjacent cells. If the parameter F is set to the value obtained through the experiment accomplished for a BTS, the value $\overline{M}$ determined in the step S9 means the number of MSs which are connected with the BTS.

Figure 7:
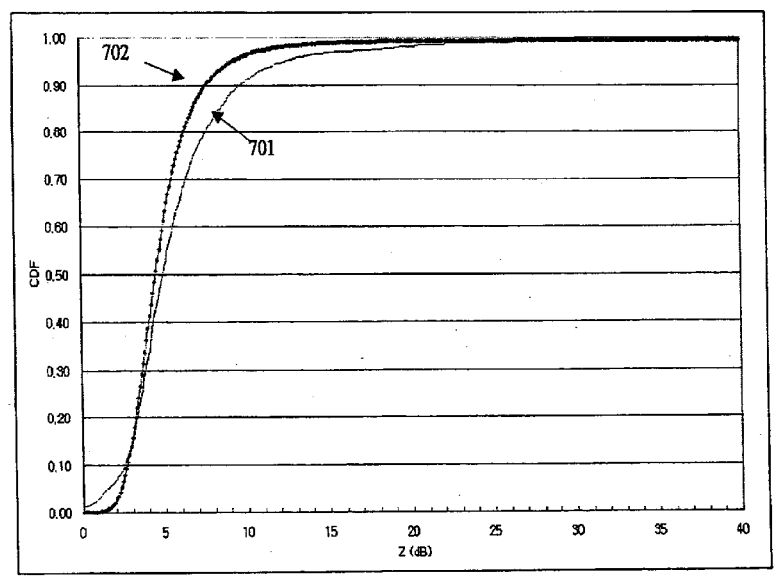
FIG. 7 shows the pictorial comparison between a theoretically-constructed CDF curve with a practically-obtained CDF curve obtained from measuring and sampling.

FIG. 6 illustrates an example to find the most similar curve through MMSE curve comparison of the practical PDF acquired from the sampled data and the theoretically-modeled PDFs. FIG. 6 shows that the theoretical curve 602 is the most similar to the practical curve 601. FIG. 7 shows an example of CDF curves in which the curve 702 is a theoretical CDF and is nearly identical to the curve 701 constructed from the sampled data.

As shown in FIG. 4, it is possible to estimate the number of MSs which are in service through a concerned FA of a concerned sector of a BTS by using the statistical characteristics (peak, average, variance, 10%-ile, median, 20%-ile~80%-ile width in dB) of PDF and CDF for the ratio Z. For example, the peak value Z_peak in the PDF can be calculated by the following equation.

$$Z\_peak\ (dB) = -\frac{1}{\beta}\log\left[\frac{(1-E[X])+\sqrt{(1-E[X])^2 + 4\cdot Var(X)}}{2}\right]$$

By comparison of the theoretical value with the measured value for the Z_peak, a desirable value can be found quickly. Of course, the Z_peak may be combined with other statistical information to obtain a desirable value.

FIG. 5 depicts a flowchart for another method to measure the quality of a reverse link in a mobile telecommunication system. In FIG. 5, the same steps as the example shown in FIG. 4 have the identical numeral reference.

An average number of in-service channels is calculated by using the real-time channel information provided through the network linker 106 in the BTS 100 or other connection link (S10), the average number is selected as an input parameter whose value is used to calculate theoretcial curves (S6'), and the theoretical PDFs and CDFs of Z are calculated (S7'). The step S7' is different from the step S7 in FIG. 4 in that the step S7' uses the average channel number provided from the BTS as an input parameter which is necessary to calculate the theoretical PDF and CDF. The practical PDF/CDF constructed based upon measured Z is compared with the theoretical PDF/CDF curves modeled in the step S7' (S8') and then, the link quality is determined according to the compared result (S12').

In addition, it is also possible to estimate the quality of a reverse link belonging to the FA of the concerned cell or sector based upon the difference in the statistical characteristics (for example, median, peak, 90%-ile and their combinations) derived from both PDFs (or CDFs). For example, as given in FIG. 6, assuming that the average number of MSs provided from the BTS is 35 and that the theoretical PDF is the curve 602 for $\overline{M}$=35, the link quality is good if the practical PDF curve 601 which is very similar to the curve 602 is constructed from the measured Z. However, the quality of a reverse link is concluded to be abnormal if the practical PDF curve 603 is constructed since it is quite different from the curve 602 in median value although the peaks are almost same.

The fact that the variance of PDF obtained from the sampled data is smaller means that the power control is more stable and the channel characteristics are better, under similar conditions having the same traffic load. On the contrary, if the variance of PDF is large, the current power control is unstable and the channel characteristics are bad. Once the standard factor for the PDF is chosen, the measuring device 200 can measure the current quality of a reverse link by acquiring the value of the standard factor from the PDF curve.

The link quality is always monitored by sending the measurement result to a remote management center via a CDMA network. To obtain more reliable data about the number of MSs in service and the link quality, it is necessary to repeat the above-explained operation several times.

Instead of the ratio Z of a received power to a background noise power, the received power may be used to measure the link quality. That is, the power of a received signal in a BTS is repeatedly measured within a set time window. A statistical distribution graph for a receiving power is then constructed by using the data about the measured receiving power. The constructed distribution graph is then compared with statistical distribution reference graphs that are theoretically-calculated in advance according to the system parameters of a BTS. The traffic load and the quality of a reverse link is finally determined based upon the difference between a practical graph and a theoretical graph by determining the most similar reference graph.

The present invention for measuring the quality of a reverse link in a CDMA system can give the real-time information on the number of MSs in service and the interference from the adjacent cells, while the conventional methods give only the number of hardware channels in service as real-time information. Also, the present invention enables a BTS to know about how much the neighboring BTSs and some repeaters affect a concerned BTS, and whether there are MSs fallen into bad communication condition, and how well the power control to MSs is proceeding.

Furthermore, if the exact total traffic load provided by the present invention is considered, the resource of a BTS having weak load can be reallocated to a BTS having heavy load to use limited resources effectively. Since the measurement of the link quality of a concerned BTS can be monitored at a remote center without manual measurement by an operator, a mobile communication service provider can supply more reliable service, reduce the cost to manage a mobile network, and know the influence without using a measuring vehicle when various equipment is added or a new BTS is established.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for measuring the quality of a reverse link in a mobile communication system, comprising:
   power detecting means for detecting the power of signals incoming to a base station;
   control means for sampling the detected power, constructing a PDF (Probability Density Function) and/or a CDF (Cumulative Distribution Function) for a ratio of a received power to a background noise power from more than 2 sampled data, comparing the constructed function with theoretical PDF and/or CDF for the ratio which is pre-calculated based upon various input parameters, and determining the traffic load according to the compared result; and
   data entering means for receiving the values for the input parameters.

2. An apparatus set forth in claim 1, wherein said control means compares the determined traffic load with a traffic load according to the number of MSs in service which is provided by the base station in real-time, and determines the quality of the reverse link base upon the difference between two traffic loads.

3. An apparatus set forth in claim 2, wherein said power detecting means comprises:
   a frequency converter for changing a high frequency signal which is low-noisily amplified in the base station to an intermediate frequency signal;

a bandpass filter for attenuating out of band of the intermediate frequency signal;

a power level converter for converting the power of the bandpassed intermediate frequency signal to a voltage signal; and a level adjuster for adjusting the level of the voltage signal to belong to the input range of said control means.

4. An apparatus set forth in claim 1, wherein said control means compares the constructed PDF or CDF with theoretical PDF or CDF, and determines the quality of the reverse link based upon the difference between two functions.

5. An apparatus set forth in claim 4, wherein said power detecting means comprises:

a frequency converter for changing a high frequency signal which is low-noisily amplified in the base station to an intermediate frequency signal;

a bandpass filter for attenuating out of band of the intermediate frequency signal;

a power level converter for converting the power of the bandpassed intermediate frequency signal to a voltage signal; and a level adjuster for adjusting the level of the voltage signal to belong to the input range of said control means.

6. An apparatus set forth in claim 1, further comprising selecting means for choosing a single signal among a plurality of signals received from the base station, applying the chosen signal to said power detecting means wherein the choice of said selecting means is controlled by said control means.

7. An apparatus set forth in claim 6, wherein said power detecting means comprises:

a frequency converter for changing a high frequency signal which is low-noisily amplified in the base station to an intermediate frequency signal;

a bandpass filter for attenuating out of band of the intermediate frequency signal;

a power level converter for converting the power of the bandpassed intermediate frequency signal to a voltage signal; and a level adjuster for adjusting the level of the voltage signal to belong to the input range of said control means.

8. An apparatus set forth in claim 1, wherein said power detecting means comprises:

a frequency converter for changing a high frequency signal which is low-noisily amplified in the base station to an intermediate frequency signal;

a bandpass filter for attenuating out of band of the intermediate frequency signal;

a power level converter for converting the power of the bandpassed intermediate frequency signal to a voltage signal; and a level adjuster for adjusting the level of the voltage signal to belong to the input range of said control means.

9. An apparatus set forth in claim 1, further comprising an interfacing means for intermediating data between said data entering means and said control means wherein said data entering means is an external device.

10. A method for measuring the quality of a reverse link in a mobile communication system, comprising the steps of:

(a) detecting a signal power received in a base station;

(b) calculating a ratio of the detected power to a background noise power;

(c) constructing a PDF (Probability Density Function) and/or a CDF (Cumulative Distribution Function) of the calculated ratios by iterating the steps (a) and (b) more than 2 times; and (d) comparing the constructed PDF and/or CDF with theoretical PDF and/or CDF for the ratio which is pre-calculated based upon various input parameters and determining the traffic load based upon the compared result.

11. A method set forth in claim 10, further comprising the step of (e) comparing the determined traffic load with an average traffic load provided from other device and determining the quality of the reverse link based upon the load comparing result.

12. A method set forth in claim 11, wherein the input parameters include the average traffic load provided from other device.

13. A method set forth in claim 10, wherein said step (d) compares the constructed PDF or CDF with a theoretical PDF or CDF, and determines the quality of the reverse link based upon the difference between two functions.

14. A method set forth in claim 10, wherein the theoretical PDF is constructed by the equation of $$p_z(z) = \frac{1}{\sqrt{2\pi Var(x)}} e^{-\frac{[1-e^{-\beta z}-E(x)]^2}{2Var(x)}} \beta e^{-\beta z},$$

and the theoretical CDF is constructed by the equation of $$P_z(z) = \frac{1}{\sqrt{2\pi}} \int_{-\infty}^{\frac{1-e^{-\beta z}-E(x)}{\sqrt{Var(x)}}} e^{-y^2/2} dy,$$

where $$\beta = \frac{\ln 10}{10}, E[X] = \frac{R}{W} \cdot \overline{M} \cdot \overline{v} \cdot e^{\beta \varepsilon + (\beta\sigma)^2/2} \cdot (1+F),$$

$$Var(X) = \left(\frac{R}{W}\right)^2 \cdot \overline{M} \cdot e^{2\beta\varepsilon + (\beta\sigma)^2} \left[\overline{v^2} \cdot e^{(\beta\sigma)^2} - \overline{v}^2\right] \cdot (1+F),$$

R is data transfer speed, $\overline{M}$ is average traffic number, $\overline{v}$ is average of a voice activity factor, $\overline{v^2}$ is average of the square of a voice activity factor, $\epsilon$ is average of the logarithmic ratio of bit energy to interference for a single mobile station, $\sigma$ is standard deviation of the logarithmic ratio of bit energy to interference for a single mobile station, and F is a ratio of the interference power generated from a self cell to that from the adjacent cells.

15. A method for measuring the quality of a reverse link in a mobile communication system, comprising the steps of:

(a) measuring the power of a received signal in a base station more than 2 times;

(b) calculating a statistical distribution graph for the measured powers; and (c) comparing the graph acquired in step (b) with statistical distribution reference graphs which are theoretically-calculated according to various input parameters about a base station, and determining the quality of the reverse link based upon the compared result.

* * * * *